Jan. 11, 1966     C. W. ROBINETTE ETAL     3,228,607
ELECTRIC TRACKWAY FOR TOY VEHICLES
Original Filed Jan. 26, 1959                3 Sheets-Sheet 1

Inventors
D. K. Gowland
C. W. Robinette
By
Attorneys

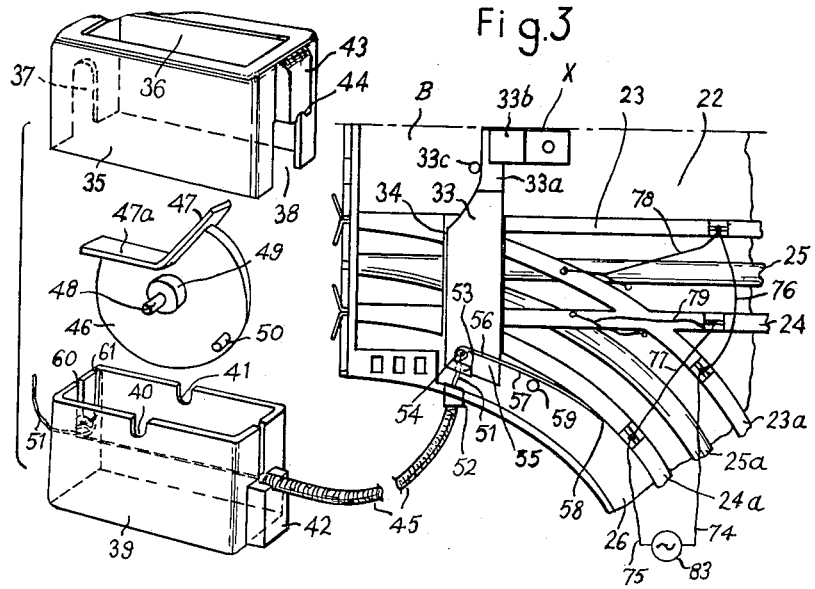
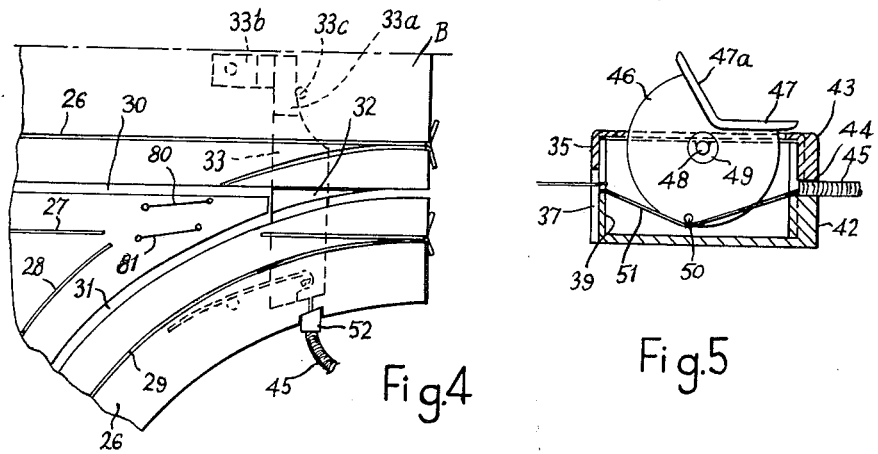
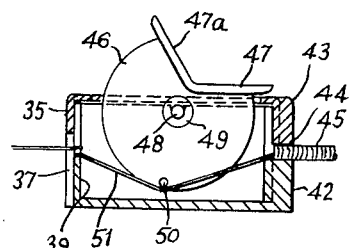
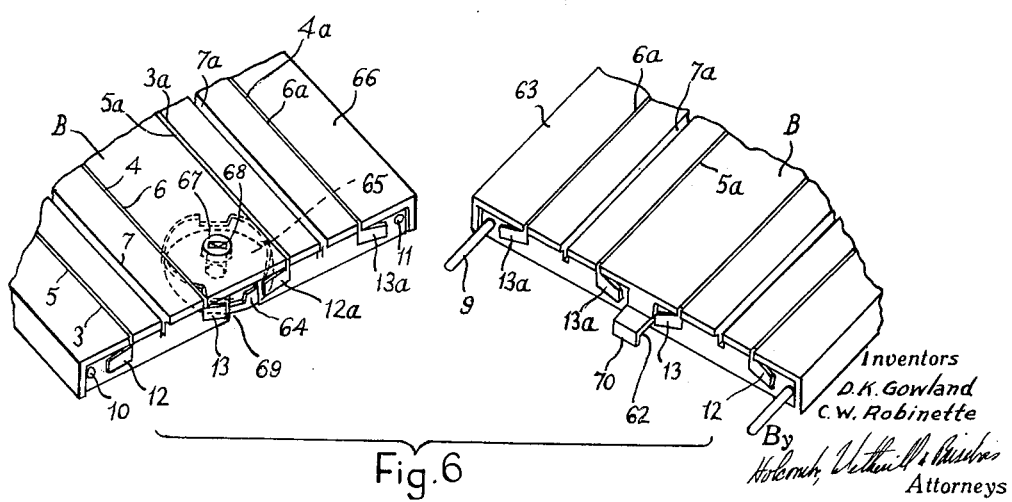

Inventor
D.K. Gowland
C.W. Robinette

United States Patent Office 3,228,607
Patented Jan. 11, 1966

3,228,607
ELECTRIC TRACKWAY FOR TOY VEHICLES
Carl W. Robinette, 2280 Santiago Road, Santa Barbara,
Calif., and Douglas K. Gowland, Great Park Farm,
Catsfield Battle, England
Continuation of application Ser. No. 788,919, Jan. 26,
1959. This application May 12, 1965, Ser. No. 457,243
2 Claims. (Cl. 238—10)

This application is a continuation of United States patent application Serial No. 788,919, filed on January 26, 1959.

The present invention relates to electric trackways for toy vehicles of the kind employing separable track members comprising electrical conductors located in a base of insulating material, the vehicles having depending brushes or other pickup means adapted to touch the conductors to pick up electrical current therefrom. The conductors are connected to a suitable source of electrical energy.

It is an object of the present invention to provide an electric trackway for toy vehicles embodying a novel construction of conductor elements whereby to ensure efficient electrical continuity between the separable track members when they are secured together.

Another object is to provide an electric trackway in which the conductor members apply spring pressure between the separable track members so that in conjunction with an appropriate linking means good electrical continuity is preserved between the conductor elements, without impairing mechanical efficiency when the track members are in the connected position.

Another object of the invention is to provide an electric trackway for toy vehicles comprising a plurality of track members adapted to be joined together in such a manner as to ensure electrical continuity between conductive track elements carried by said track members.

Another object is to produce an electric trackway in which the conductors are embedded in the vertical direction with their upper edges substantially flat with the surface of the track members.

Other objects and advantages of the invention will be pointed out in the specification that is to follow.

In order that the invention may be more clearly understood reference will now be made to the accompanying drawings which show two specific embodiments thereof by way of example and in which:

FIGURE 3 shows an underneath plan view of a set of track-switching points and an exploded perspective view of a controller for controlling same;

FIGURE 4 shows a top plan view of the portion of track shown in FIGURE 3;

FIGURE 5 shows a section through the controller shown in FIGURE 3;

FIGURE 6 shows a perspective view of adjoining parts of two track members with a modified linking means, and, FIGURE 7 shows a plan view of a complete trackway as an example of the use of track members according to the invention.

Figure 1:
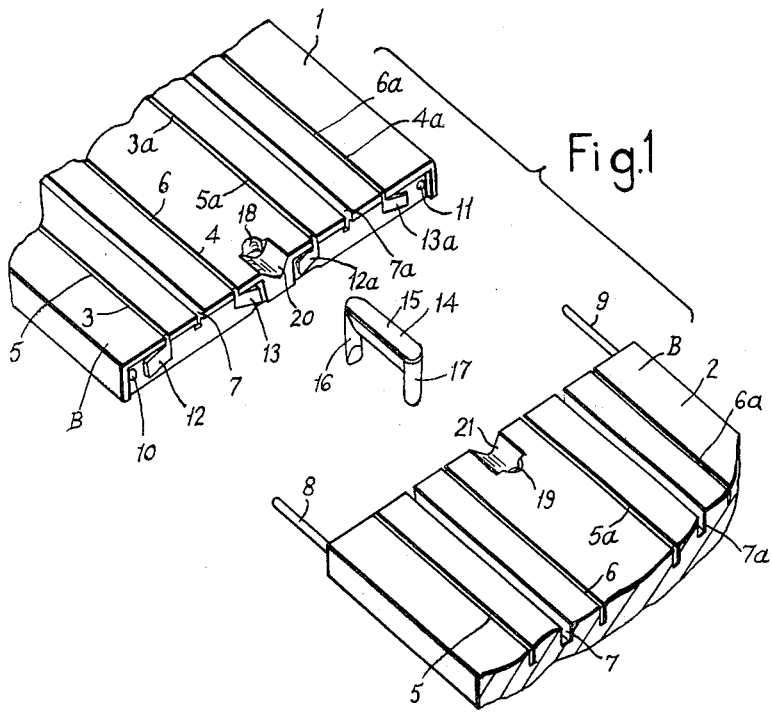
FIGURE 1 shows a perspective view of adjoining parts of two track members in the separated condition, together with their joining link.

Referring to FIGURE 1 there are shown parts of two track members 1 and 2, each comprising a base of a suitable insulating material B, for example a mouldable synthetic plastic material, in which are provided a series of longitudinal grooves. The grooves 3 and 4 constitute mounting means for conductive track elements 5 and 6 and a groove 7 is located between the grooves 3 and 4 for receiving and guiding a projection from a steerable bogie of a toy vehicle for which the trackway is intended. Neither the vehicle nor the bogie is illustrated here as it forms no part of the present invention. The conductive track elements 5 and 6 together with the grooves 7 form a track for the toy vehicle which is provided with pickup brushes or strips which contact the elements 5 and 6 to which a suitable source of electrical energy is connected at any convenient place as will be described later.

If desired and preferably, a plurality of tracks is provided on each track member and the drawings show two such tracks running side by side. Any desired number may, however, be provided. The parts of the second track so illustrated bear the same reference numerals as for the first track but with the suffix a.

In order to locate any two adjacent parts of the trackway together, locating means are provided, in the examples shown, with pegs 8 and 9 adapted to interfit in recesses 10 and 11 respectively. It will be apparent that although FIGURE 1 illustrates one of the two adjacent track members as having the pegs and the other track member having the apertures, each member may have one peg and one aperture.

Tracks of the above general character have already been made but they have suffered from the disadvantage that in the connected condition adequate electrical contact is not easily made between the various conductive track elements. The invention solves this problem by locating the said track elements vertically within the grooves provided therefor, i.e. the grooves 3, 4, 3a, 4a, are made so that their depth is great relatively to their width whereby the transverse dimension of the conductive track elements is accommodated within the depth of the groove and not as heretofore in such a manner that the said transverse dimension follows the transverse dimension of the track member. The upper edges of the inserted track elements are substantially flush with the upper face of the base B. Moreover, in accordance with the teaching of this invention, a portion of each track element extending below the upper edges of the track element is allowed to project beyond each end of the base B and is bent back as shown at 12, 13, 12a, 13a in FIGURE 1.

Figure 2:
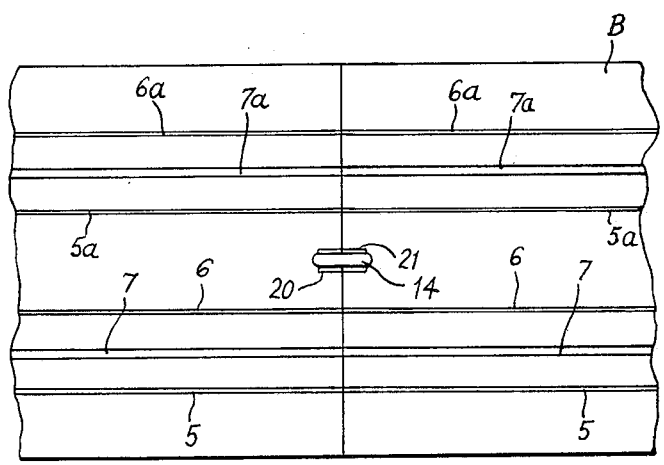
FIGURE 2 shows a plan view of the parts of FIGURE 1, joined together.

Further, as shown in FIG. 1, the upper face of the track members 1 and 2 is substantially flat and this upper face extends beyond the body of the base B at both ends of the track members to provide overhangs B' which serve to cover or hide the projecting ends of the conductive track elements to thus present a continuous substantially flat upper surface when contiguous track members are connected together. The material of the conductive track element is of a springy nature whereby the said projecting ends are resilient. As a result of this construction when two adjacent track members are held together, the projecting parts of the track elements contact each other in juxtaposition along a relatively wide face ensuring good electrical contact between the elements. To assist in this good contact, link means are provided to link and lock each two adjacent track members together. In FIGURE 1, the link means is shown at 14 and comprises a horizontal bar portion 15 with two depending lug portions 16 and 17 and to receive the link the coadjacent parts of the track members are each provided with an aperture 18 and 19 to take one of the lug members 16 and 17, and recesses 20, 21 to accommodate the horizontal bar portion 15 when placed together. In order to enable the link to be easily removed, the width of the recesses 20, 21 is greater than that of the width of the bar portion 15 as is more clearly visible in FIGURE 2 which shows the two parts of the track members in FIGURE 1 assembled together. The two members are securely held by the link owing to the springiness of the track elements which springiness therefore performs the dual function of good electrical continuity and mechanical efficiency.

The trackway may take any desired form and may comprise straight parts, curved parts, and combinations of the two. For example in FIGURE 3 there is shown an underneath plan view of part of track member 22, 26 representing a confluence of straight and curved tracks and incorporating track switching points. This figure also clearly shows how the individual track elements are housed in the base B. Ribs 23 and 24 are formed in the underside of the track member 22 during moulding of the base and the slots for the track elements are formed in these ribs from the upper face of the track member. Similarly a wider rib 25 is provided for location of the groove 7. The grooves may be formed in the ribs in any desired fashion, for example, during the moulding of the base, or may be cut in afterwards. If desired, the base could be made sufficiently thick all over to accommodate the grooves, but the arrangement illustrated is economical in material and is therefore preferred. FIGURE 3 also shows a portion 26 of circular track form having rib formations 23a, 24a, and 25a similar to 23, 24, 25 of member 22. FIGURE 4 shows an upper plan view of the portion of the track shown in FIGURE 3 and showing the straight conductive track elements 26 and 27 and curved elements 28 and 29 having the central guiding grooves 30 and 31 respectively. In order to switch tracks so that a toy vehicle may proceed as desired along the straight portion or the curved portion, a triangular movable element 32 is located at the conjunction between the straight and curved portion, as shown in FIGURE 4, and the shape and location of this triangular element 32 is such that in the position shown in FIGURE 4, the groove 31 is clear and the groove 30 is blocked; in the other position of the element the groove 30 is clear and the groove 31 is blocked. In order to bring about this movement the element 32 is mounted on a plate 33 slidable in a slot 34 formed across the ribs 23, 24 and 25, and 23a, 24a, and 25a, as shown in FIGURE 3. In order to control the movement of the triangular element there is provided a controller comprising an outer shell 35 having an upper opening 36 and two end openings 37 and 38 respectively. The underside of the shell 35 is open to receive an inner shell 39 which also is of open boxlike construction, and in the upper edges of which are provided two aligned recesses 40 and 41. At one end there is provided a support block 42 and when the two shells 35 and 39 are assembled together, the support 42 mates with a support 43 on the shell 35 but defining between them an opening 44 to allow the passage of a control cable 45.

The operating member for the controller comprises a disc 46 which is nearly circular in shape having a small cut-away portion with an upper flange comprising two surfaces 47, 47a at an angle of slightly more than 90° relatively each to the other as shown in FIGURES 3 and 5. A supporting shaft 48 projects from each face of the disc 46 from a base 49 and sits in the aligned recesses 40 and 41. On the edge of the disc 46 opposite the flange 47, 47a there is provided a peg 50 which protrudes from both faces or one face only of the disc. The control cable 45 comprises an outer casing and an inner thread 51. The outer casing 45 is a force fit in a base 52 projecting from the curved track portion 26 and the adjacent end of the thread 51 is secured to the slide 33 as shown in FIGURE 3 by passing through an aperture in a lug 53 and being tied behind same in a knot 54. The slide 33 is formed at 55 to provide the lug 54 and a shoulder 56 to support a return spring 57, one end of which bears against the rib 24a at 58 and the other end of which bears against the shoulder 56, being steadied centrally by a peg 59 protruding upwardly (with respect to FIGURE 3), from the underface of the track member.

When the box parts 35 and 39 are assembled together as shown in FIGURE 5 to grip the outer case of cable 45 in the opening 44, the thread 51 is secured by being passed between slots 60 and 61 formed in the one end of the inner shell 39 as shown in FIGURE 3. It will be clear from a study of FIGURE 5 that in the position of the flange 47 shown, the peg 50 presses downwardly on the thread 51 so as to pull the thread against the return spring 57 and move slide 33 in the direction for the element 33 to block the circular track groove 31. When the other portion 47a of the flange is pressed downwards referring to FIGURE 5, the peg 50 will be moved out of contact with the thread 51 whereby the slide can move back under action of the spring 57. It will be seen that from the construction of the controller the tension on the thread can be adjusted to take up any extension thereof during use by separating the shell parts 39 and 45 and rewinding the thread in the slots 60 and 61 in the new position. For this reason a generous portion of thread 51 is left to protrude from the controller.

The thread 51 must be of a material resistant to friction; we have found that a nylon thread is very suitable. The other parts of the controller may all be moulded from synthetic plastic material.

The free end of slide 33 is reduced in thickness at 33a to slide beneath a bracket 33b secured to the under face of the track member. A guide peg 33a is provided to guide the free end of the slide during its movement.

FIGURE 6 shows a modification of the means for linking contiguous track members together, comprising a hooked member 62 projecting from one end of a track member 63, which hook member is engageable behind a peripheral flange 64 of a disc 65 pivoted to the other track member 66 by a pivot stud 67. The stud 67 may have a small screwdriver slot or the like 68 to allow the disc 65 to be rotated to a position in which the flange 64 is movable away from an edge slot 69 in the end of the member 66. The two track members are then engaged together so that the hooked member projects through the slot 69, lying above the upper edge of the flange 64, so that when the stud 67 is rotated to turn the disc, the flange 64 will pass in front of the downwardly extending lug 70 on the member 62 to secure the latter in position and lock the parts together against springy rotation by the bent-over protruding ends 12, 13, 12a, 13a of the track elements.

Figure 7:
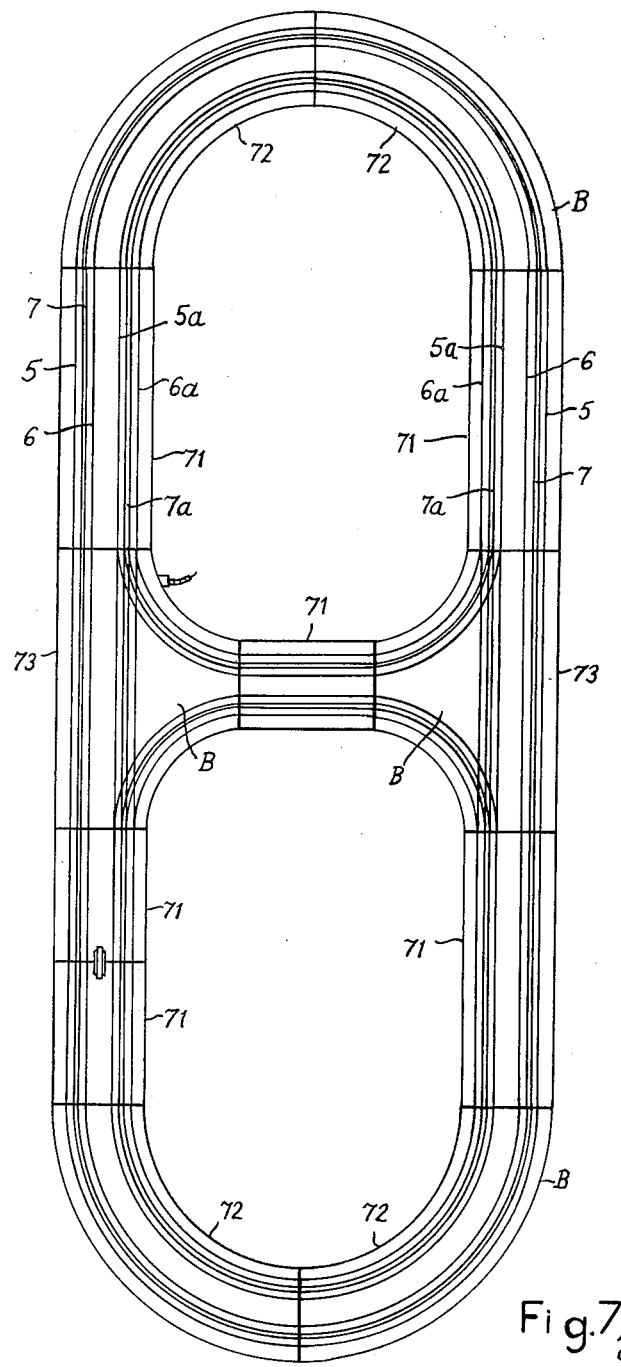

FIGURE 7 shows a manner in which a number of track members according to the invention may be combined together to form a complete trackway for a toy vehicle, and in this figure are shown straight track members 71 of various sizes, curved members 72 also of various sizes and special track members 73 embodying straight and curved track sections and track-switching points described in connection with FIGURES 3 and 4. It will be apparent that other configurations of trackway than those illustrated may be employed as desired.

In order to supply motive power to the trackway at any convenient place but illustrated as being on the track-switching points, electrical conductors 74 and 75 are soldered to the conductive track elements through openings formed in the appropriate ribs as shown in FIGURE 3. In order to provide electrical continuity between the points and the straight portions, bridging conductors 76 and 77 are also interconnected between the elements, also as shown in FIGURE 3. In order to provide electrical track continuity at the points where the circular tracks merge into the straight tracks as shown in FIGURE 4, additional conductors 78 and 79 are also shown between the conductors 76 and 77 respectively.

The conductors 78 and 79 pass through holes formed as shown in FIGURE 3 and looped round to provide continuity portions as shown at 80 and 81 in FIGURE 4, so that at all material times the toy vehicles proceeding on the tracks will be supplied with current. The conductors 74 and 75 lead to any desired source of electrical energy schematically illustrated as an A.C. generator 83; it will, however, be understood that any other form of motive source may be used as desired.

We claim:
1. Electric trackway for toy vehicles comprising a plurality of elongated track members, the upper surfaces of said track members extending beyond each end of the bodies of said track members to form overhangs at the ends thereof, a pair of thin strip-like conductive track elements of springy material embedded in each of said track members and extending longitudinally thereof, the principal planes of said elements being at right angles to the principal planes of said track members and the upper longitudinal edges of said elements being substantially flush with the upper surfaces of said track members, each conductive element being longer than its track member and having an end projecting from each end of its track member, both of the projecting ends of each conductive element being bent out of the plane of said conductive element toward the same side of the track member, said bent-over ends projecting slightly and resiliently beyond the ends of the track members and being positioned to resiliently contact and repel each other when the ends of two contiguous track members are brought together in longitudinal alignment, and a link member connecting each two contiguous track members to hold the two said track members together in a connected position against the repulsive force exerted by said bent-over conductive element ends.

2. Electric trackway for toy vehicles comprising a plurality of elongated track members, the upper surfaces of said track members extending beyond each end of the bodies of said track members to form overhangs at the ends thereof, a pair of thin strip-like conductive track elements of springy material embedded in each of said track members and extending longitudinally thereof the principal planes of said elements being at right angles to the principal planes of said track members and the upper longitudinal edges of said elements being substantially flush with the upper surfaces of said track members, each conductive element being longer than its track member and having an end projecting from each end of its track member, both of the projecting ends of each conductive element being bent out of the plane of said conductive element toward the same side of the track member, said bent-over ends projecting slightly and resiliently beyond the ends of the track members and being positioned to resiliently contact and repel each other when the ends of two contiguous track members are brought together in longitudinal alignment, and a link member connecting each two contiguous track members to hold the two said track members together in a connected position against the repulsive force exerted by said bent-over conductive element ends whereby said bent-over conductive element ends are hidden from view when contiguous track members are connected together.

References Cited by the Examiner

UNITED STATES PATENTS

| | | | |
|---|---|---|---|
| 1,575,089 | 3/1926 | Becker | 238—10 |
| 1,657,511 | 1/1928 | Lorenz et al. | 104—60 |
| 1,668,249 | 5/1928 | Rich | 104—149 X |
| 2,153,624 | 4/1939 | Jones | 238—10 |
| 2,232,511 | 2/1941 | Caruso | 238—10 |
| 2,401,468 | 6/1946 | Duffy | 238—10 |
| 2,576,828 | 11/1951 | Faber | 238—10 |
| 2,647,693 | 8/1953 | Carver | 238—10 |
| 3,048,124 | 8/1962 | Lovell | 104—60 X |

FOREIGN PATENTS 708,187   4/1954   Great Britain.

EUGENE G. BOTZ, *Primary Examiner.*

ARTHUR L. LA POINT, *Examiner.*

S. B. GREEN, *Assistant Examiner.*